United States Patent
Jablonski et al.

(10) Patent No.: US 11,162,613 B2
(45) Date of Patent: Nov. 2, 2021

(54) FLOW CONDITIONER FOR A VALVE ASSEMBLY

(71) Applicant: FISHER CONTROLS INTERNATIONAL LLC, Marshalltown, IA (US)

(72) Inventors: Jason D. Jablonski, Marshalltown, IA (US); Anthony R. Apland, Marshalltown, IA (US); David S. Scheffert, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 16/171,661

(22) Filed: Oct. 26, 2018

(65) Prior Publication Data
US 2020/0132221 A1    Apr. 30, 2020

(51) Int. Cl.
*F16K 47/08*    (2006.01)
*F15D 1/02*    (2006.01)
*F16L 55/027*    (2006.01)

(52) U.S. Cl.
CPC .............. *F16K 47/08* (2013.01); *F15D 1/025* (2013.01); *F16L 55/02763* (2013.01); *F16L 55/02718* (2013.01)

(58) Field of Classification Search
CPC ............. F15D 1/025; F16L 55/02763; F16L 55/02718; F16K 47/08; Y10T 137/87539; Y10T 137/87531
See application file for complete search history.

(56) References Cited

U.S. PATENT DOCUMENTS 3,545,492 A * 12/1970 Scheid, Jr. ........ F16L 55/02718
138/42
3,840,051 A * 10/1974 Akashi .................... F15D 1/025
138/37

(Continued)

FOREIGN PATENT DOCUMENTS

DE    867 333 C    2/1953
DE    77 03 253 U1    9/1977
(Continued)

OTHER PUBLICATIONS

Machine Translation of DE4143309A1 retrieved from espacenet.com on Jun. 17, 2020. (Year: 2020).*

(Continued)

*Primary Examiner* — Jessica Cahill
(74) *Attorney, Agent, or Firm* — Marshall, Gerstein & Borun LLP

(57) ABSTRACT

A valve assembly including a valve body defining an inlet, an outlet, a fluid flow path, and a chamber. A control element is disposed in the chamber and in the fluid flow path, and is rotatable by a valve stem about a pivot axis between an open position and a closed position. A flow conditioner coupled to the valve body and including a first end, a second end, and a plurality of channels extending between the first end and the second end. The plurality of channels are in flow communication with the fluid flow path of the valve body when the control element is in the open position. A plurality of walls separate the plurality of channels and include a first thickness and a second thickness different than the first thickness.

20 Claims, 5 Drawing Sheets

(56) References Cited

U.S. PATENT DOCUMENTS

| | | | | |
|---|---|---|---|---|
| 4,402,485 | A * | 9/1983 | Fagerlund | F16L 55/02763 |
| | | | | 251/118 |
| 5,070,909 | A * | 12/1991 | Davenport | F16K 5/0605 |
| | | | | 137/625.32 |
| 5,482,249 | A * | 1/1996 | Schafbuch | F16K 47/08 |
| | | | | 251/118 |
| 5,937,901 | A * | 8/1999 | Bey | F16K 47/045 |
| | | | | 137/625.32 |
| 5,988,586 | A | 11/1999 | Boger | |
| 6,024,125 | A * | 2/2000 | Baumann | F16K 1/24 |
| | | | | 137/625.32 |
| 7,845,688 | B2 * | 12/2010 | Gallagher | F16L 9/147 |
| | | | | 285/412 |
| 9,506,432 | B2 * | 11/2016 | Inoue | F02M 35/1283 |
| 2010/0258193 | A1 * | 10/2010 | Christenson | F16K 5/0605 |
| | | | | 137/1 |
| 2018/0106383 | A1 * | 4/2018 | Kuhlman | F16K 5/0605 |
| 2019/0072192 | A1 * | 3/2019 | Jablonski | F16K 5/0657 |
| 2019/0316707 | A1 * | 10/2019 | Helfer | F16K 47/08 |

FOREIGN PATENT DOCUMENTS

| | | | | |
|---|---|---|---|---|
| DE | 28 10 118 | A1 | 9/1979 | |
| DE | 41 43 309 | A1 | 10/1992 | |
| DE | 4143309 | A1 * | 10/1992 | F16K 5/0605 |
| DE | 19841215 | A1 * | 4/2000 | F16K 1/2057 |
| WO | WO-2012/001671 | A2 | 1/2012 | |
| WO | WO-2012001671 | A2 * | 1/2012 | E21B 34/06 |
| WO | WO-2012136891 | A1 * | 10/2012 | F16L 55/033 |
| WO | WO-2016001475 | A1 * | 1/2016 | F16K 47/08 |
| WO | WO-2019/204052 | A1 | 10/2019 | |

OTHER PUBLICATIONS

International Search Report and Written Opinion for PCT/US2019/058029, dated Feb. 7, 2020.

* cited by examiner

A-A

FLOW CONDITIONER FOR A VALVE ASSEMBLY

FIELD OF DISCLOSURE

The present disclosure generally relates to a valve assembly, and, more particularly, to a flow conditioner of a valve assembly.

BACKGROUND

In some valves, unwanted noise is produced by fluctuating pressure waves that arise from fluid flowing through a control valve. Hydrodynamic noise, for example, may be caused by cavitation, which is the formation and collapse of vapor cavities of a flow stream subject to rapid pressure changes. When the vapor cavities in the fluid are subject to higher pressure, the vapor cavities implode and can generate an intense shock wave that can damage internal portions of the valve or produce audible noise. Aerodynamic noise, for example, may be caused by turbulent flow of gas or vapors. Flow conditioners or anti-cavitation devices may be used with control valves to control hydrodynamic and aerodynamic noise.

SUMMARY

In accordance with a first exemplary aspect, a valve assembly may include a valve body defining an inlet, an outlet, and a fluid flow path connecting the inlet and the outlet. The valve assembly may include a valve port disposed in the fluid flow path, a valve stem disposed in the valve body, and a control element disposed in the fluid flow path. The control element may be operatively connected to the valve stem such that the control element is rotatable by the valve stem about a pivot axis between an open position, in which the control element permits fluid flow through the valve port, and a closed position, in which the control element seals the valve port. The valve assembly may further include a flow conditioner coupled to the valve body. The flow conditioner may include a first end adjacent to the control element, a second end adjacent to the outlet, and a plurality of channels extending between the first end and the second end. The plurality of channels may be in fluid communication with the fluid flow path of the valve body when the control element is in the open position. The flow conditioner may further include a plurality of walls separating the plurality of channels. A first wall separating at least two channels may have a first thickness and a second wall separating at least two channels may have a second thickness different than the first thickness.

In accordance with a second exemplary aspect, a flow conditioner of a valve assembly may include a body having a first end and a second end and a plurality of channels extending between the first end and the second end of the body. The plurality of channels may be arranged in at least a first segment and a second segment adjacent to the first segment. The flow conditioner may further include a plurality of walls. Each wall of the plurality of walls may separate at least two channels of the plurality of channels. An average cross-sectional area of one of the plurality of channels of the second segment may be greater than an average cross-sectional area of one of the plurality of channels of the first segment.

In accordance with a third exemplary aspect, a flow conditioner of a valve assembly may include a body having a first end, a second end, and a longitudinal axis. A plurality of channels may extend between the first end and the second end of the body. The plurality of channels may be parallel with the longitudinal axis and may be arranged in at least a first segment and a second segment. The second segment may be adjacent to the first segment. A first wall thickness may define the plurality of channels of the first segment and a second wall thickness may define the plurality of channels of the second segment. The first wall thickness may be greater than the second wall thickness. A cavity may be formed in the body and in fluid communication with a portion of the plurality of channels. An average cross-sectional area of one of the plurality of channels of the second segment may be greater than an average cross-sectional area of one of the plurality of channels of the first segment.

In further accordance with any one or more of the foregoing first, second, or third aspects, a valve assembly and/or a flow conditioner may further include any one or more of the following preferred forms.

In a preferred form, a first portion of the plurality of channels may be arranged into a first segment and a second portion of the plurality of channels may be arranged into a second segment adjacent the first segment.

In a preferred form, the first wall may separate at least two channels of the first segment, and the second wall may separate at least two channels of the second segment.

In a preferred form, the first thickness may be greater than the second thickness.

In a preferred form, the flow conditioner may include a cavity disposed between the first end and the second end of the flow conditioner.

In a preferred form, the cavity may be in fluid communication with a portion of the plurality of channels.

In a preferred form, the cavity may have a first end and a second end adjacent to the second end of the flow conditioner.

In a preferred form, the first end of the cavity may have a cross-sectional area that is smaller than a cross-sectional area of the second end of the cavity.

In a preferred form, an average cross-sectional area of one of the plurality of channels at the first segment may be different than an average cross-sectional area of one of the plurality of channels at the second segment.

In a preferred form, the average cross-sectional area of the one of the plurality of channels of the first segment may be less than the average cross-sectional area of the one of the plurality of channels of the second segment.

In a preferred form, an average length of the one of the plurality of channels may be greater than an average length of the one of the plurality of channels of the second segment.

In a preferred form, when the control element occupies a first open position, the first segment may be exposed to direct fluid flow and the second segment may be blocked from direct fluid flow.

In a preferred form, the plurality of channels may be further arranged into a third segment adjacent to the second segment and a fourth segment adjacent to the third segment.

In a preferred form, when the control element occupies a third open position, the plurality of channels of the third segment may be exposed to direct fluid flow and the plurality of channels of the fourth segment may be blocked from direct fluid flow.

In a preferred form, a ratio of average cross-sectional area of one of the plurality of channels of the fourth segment to average cross-sectional area of one of the plurality of channels of the third segment may be approximately 2:1.

In a preferred form, a ratio of average cross-sectional area of one of the plurality of channels of the fourth segment to average cross-sectional area of the one of the plurality of channels of the first segment may be in a range of approximately 6:1 to approximately 4:1.

In a preferred form, a chamber may be defined by the valve body and may be sized to receive the control element.

In a preferred form, the first end of the flow conditioner may be disposed in the chamber adjacent the control element.

In a preferred form, a wall thickness of the first segment may be greater than a wall thickness of the second segment.

In a preferred form, a ratio of wall thickness to an average cross-distance of the one of the plurality of channels of the first segment may be in a range of approximately 1:3 to approximately 1:2.

In a preferred form, an average cross-sectional area of one of the plurality of channels of the third segment is greater than an average cross-sectional area of one of the plurality of channels of the second segment.

In a preferred form, a ratio of the average cross-sectional area of one of the plurality of channels of the third segment to the average cross-sectional area of one of the plurality of channels of the second segment may be in a range of approximately 2:1 to approximately 5:1.

In a preferred form, a ratio of the average cross-sectional area of one of the plurality of channels of the third segment to the average cross-sectional area of the one of the plurality of channels of the first segment may be in a range of approximately 2:1 to approximately 6:1.

DETAILED DESCRIPTION

Figure 2:
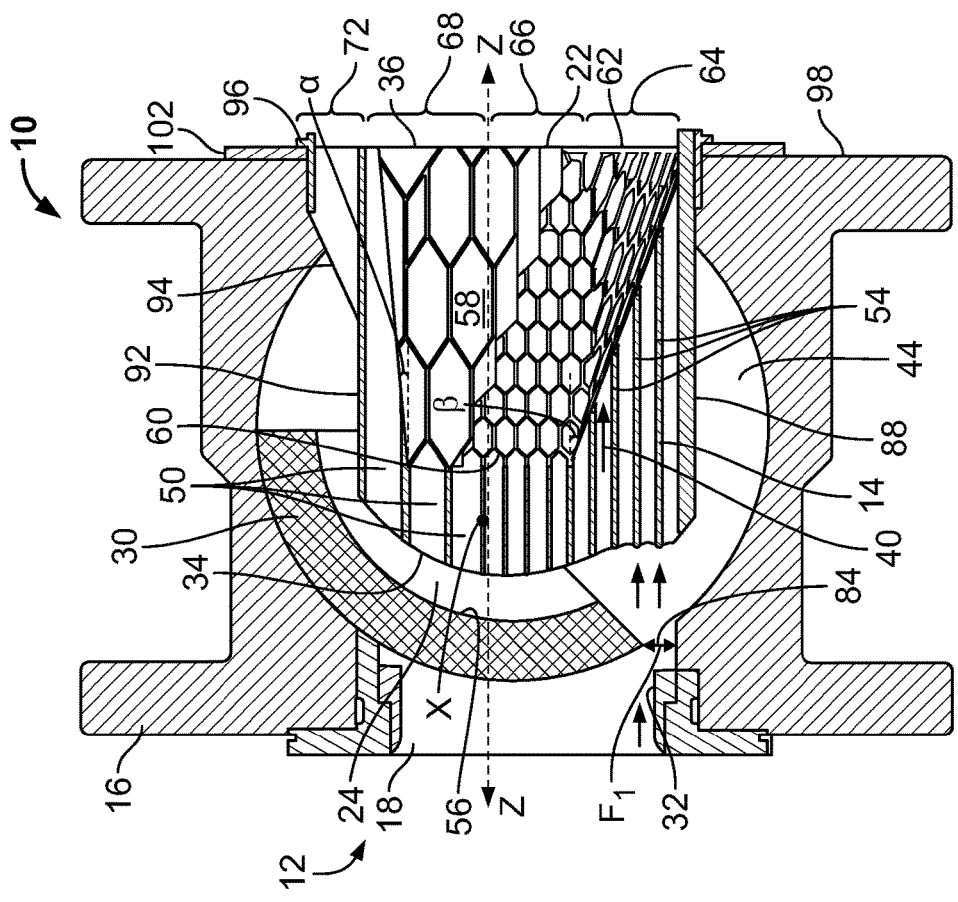
FIG. 2 is a side, cross-sectional view of the valve assembly and flow conditioner of FIG. 1 showing the control element of the valve assembly in a first open position.

In FIGS. 1 through 4, a first exemplary rotary valve assembly 10 includes a control valve 12 and a flow conditioner 14 and is constructed according to the teachings of the present disclosure. The control valve 12 includes a valve body 16 defining an inlet 18, an outlet 22, and a fluid flow path 24 connecting the inlet 18 and the outlet 22 when the valve 12 is open, or at least partially open. A valve stem 26 is disposed in the valve body 16, and is rotatable to control the opening and closing of the valve 12 by rotating a control element 30. The control element 30 is operatively coupled to the valve stem 26, is disposed in the fluid flow path 24, and controls fluid flow through the valve body 16. Specifically, the control element 30 varies the amount of flow through the valve 12 by changing position relative to a valve port 32. The control element 30 is rotatable by the valve stem 26 about a pivot axis X between an open position, in which the control element 30 permits fluid flow through the port 32 between the inlet 18 and the outlet 22, and a closed position, in which the control element 30 seals the port 32, and thereby seals the inlet 18 from the outlet 22. The flow conditioner 14 is coupled to the valve body 16 and includes a first end 34, a second end 36, and a second flow path 40 connecting the first end 34 and the second end 36. When the control element 30 is in an open or partially open position, the second flow path 40 is in fluid communication with the fluid flow path 24 of the valve body 16. In the illustrated example of FIG. 1, the valve 12 is a ball valve, and the control element 30 is a segmented ball valve 12, such as a V-notch ball valve. However, in another example, the valve may be different rotary valve 12 and the control element 30 may have any suitable shape and/or configuration.

Figure 1:
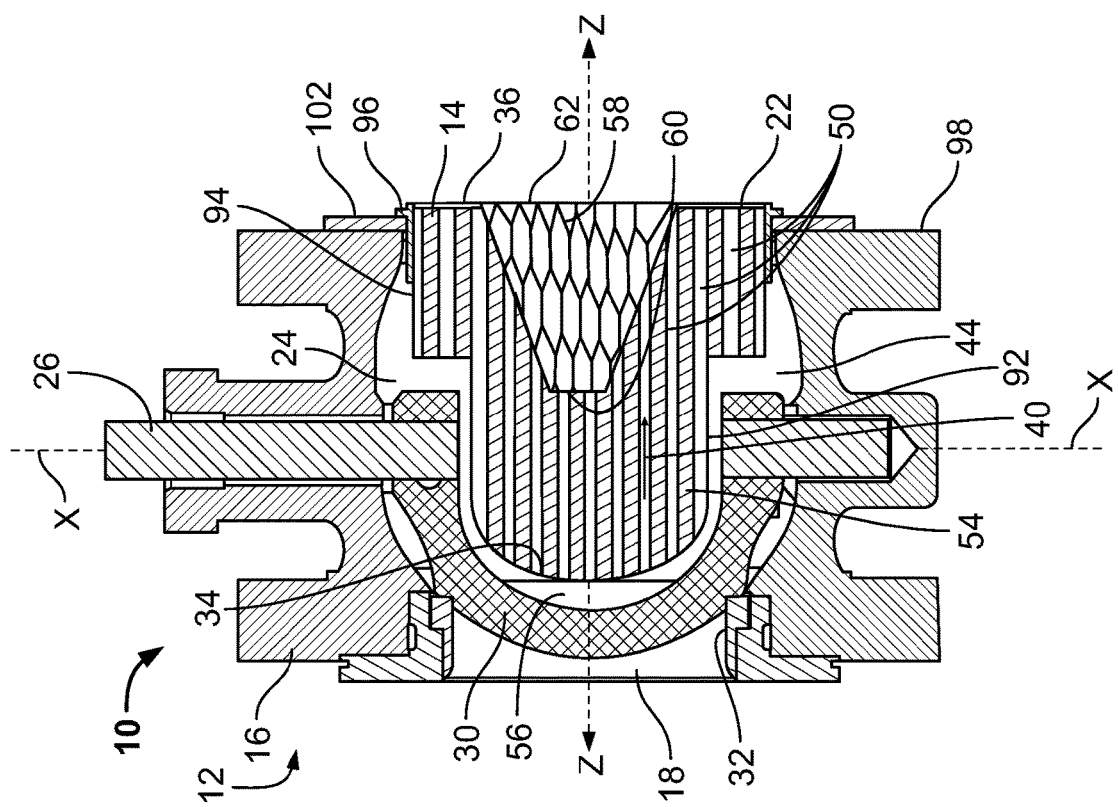
FIG. 1 is a top, cross-sectional view of a valve assembly including a flow conditioner assembled in accordance with the teachings of the present disclosure and showing a control element of the valve assembly in a closed position.

As shown in FIG. 1, the flow conditioner 14 is almost entirely disposed within the valve body 16 of the valve 12. In particular, the flow conditioner 14 is shaped to fit within a chamber 44 of the valve body that is itself shaped to permit rotational movement of the control element 30 within the valve 12. The first end 34 of the flow conditioner 14 is positioned adjacent to the control element 30, and the second end 36 of the flow conditioner 16 is adjacent to the outlet 22 of the valve 12. The flow conditioner 14 has a longitudinal axis Z and includes of a plurality of channels 50 extending parallel to the longitudinal axis Z and between the first end 34 and the second end 36 of the flow conditioner 14. The plurality of channels 50 define the second flow path 40 such that fluid flows through the plurality of channels 50 immediately after flowing through the valve port 32 when the control element 30 is in an open position. The plurality of channels 50 are separated from one another by a plurality of walls 54. From the top perspective of FIG. 1, the first end 34 of the flow conditioner 14 is shaped to permit rotation of the control element 30 about the pivot axis X between the closed position and the open position without rubbing or contacting the flow conditioner 14. In particular, the first end 34 is curved to match a curve of an interior surface 56 of the control element 30. From the side perspective illustrated in FIGS. 2 through 4, the first end 34 of the flow conditioner 14 has a different contoured profile.

As shown in FIGS. 1 through 5, the flow conditioner 14 includes a cavity 58 disposed between the first end 34 and the second end 36. As shown in FIG. 1, the cavity 58 has a generally conical shape that is generally symmetrical about an orthogonal plane (into the page in FIG. 1) relative to the longitudinal Z axis. From the perspective of FIGS. 2 through 5, the cavity 58 is asymmetrical about a second orthogonal plane (into the page in FIGS. 2 through 5) relative to the longitudinal Z axis, and includes a first wedge portion having an angle α relative to the longitudinal Z axis and a second wedge portion having an angle β relative to the longitudinal Z axis. In this example, the angle α of the first wedge portion is 20 degrees (inclined relative to the Z axis in FIGS. 2 through 5), and the angle β of the second wedge portion is 30 degrees (declined relative to the Z axis in FIGS.

2 through 5). A cross-sectional area $C_1$ of a first end 60 of the cavity 58 is smaller than a cross-sectional area $C_2$ of a second end 62 of the cavity 58. In this way, a volume of the cavity 58 gradually increases along the longitudinal Z axis of the flow conditioner 14 in the direction of fluid flow (as indicated by the arrows).

The cavity 58 is an internal void within the body of the flow conditioner 14 and is defined by a plurality of inner channels 50. The inner channels 50 are fluidly connected to the cavity 58, and combine at their distal ends to form a larger flow path. Each of these channels 50 extends from the first end 34 of the flow conditioner 14 and terminates at some location between the first end 60 and the second end 62 of the cavity 58. Some of the inner channels 50 have angled distal ends such that the channels 50 do not terminate on the same plane and help form the conical shape of the cavity volume. The angled shape and volume of the cavity 58 may promote fluid flow through the flow conditioner 14 and may reduce the amount of material and time required to manufacture the flow conditioner 14. In other examples, the flow conditioner 14 may not have a cavity 58, or the cavity 58 may have a different size and shape.

In addition to the cavity 58, the channels 50 of the flow conditioner 14 are arranged and shaped to condition fluid flow through the valve assembly 10. In particular, the plurality of channels 50 vary in size, length, and structure to better receive fluid flow during different opening stages of the control valve 12. The channels 50 are linear and extend between the first end 34 of the conditioner 14 and the second end 36 of the conditioner 14. The plurality of channels 50 are parallel with the longitudinal axis Z, and therefore each other. The second end 36, which is also the outlet end 36, of the flow conditioner 14 is shaped to fit against an inner diameter of the valve body 16 at the outlet 22, thus any fluid flowing through the valve body 16 must exit the valve assembly 12 via the plurality of channels 50 of the flow conditioner 14. The plurality of channels 50 have varying cross-sectional areas (e.g., $A_1$, $A_2$, $A_3$, $A_4$) that are arranged in particular stages or segments to achieve a desirable flow condition when the flow conditioner 14 is installed in the valve body 16. As illustrated more clearly in FIGS. 2 through 6, the channels 50 of the flow conditioner 14 are grouped in a first segment 64, a second segment 66, a third segment 68, and a fourth segment 72 such that fluid flows sequentially through the first segment 64 before flowing through the second segment 66, the third segment 68, and finally the fourth segment 72 as the control element 30 transitions to a fully open position. However, in other examples, the channels 50 may be arranged in more than four separate segments with a gradually increasing channel area from the closed position to the open position. Alternatively, in another example, the channels 50 may be arranged with fewer than four separate segments.

Figure 4:
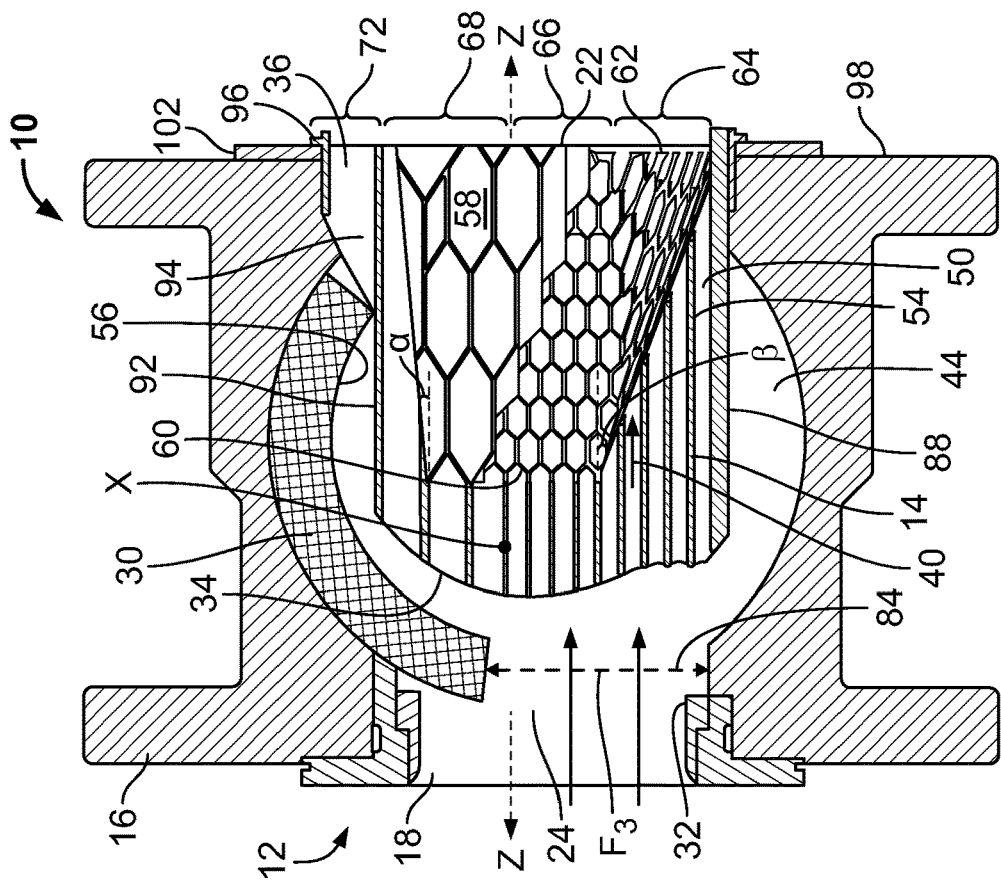
FIG. 4 is a side, cross-sectional view of the valve assembly and flow conditioner of FIG. 2 showing the control element of the valve assembly in a third open position.
Figure 3:
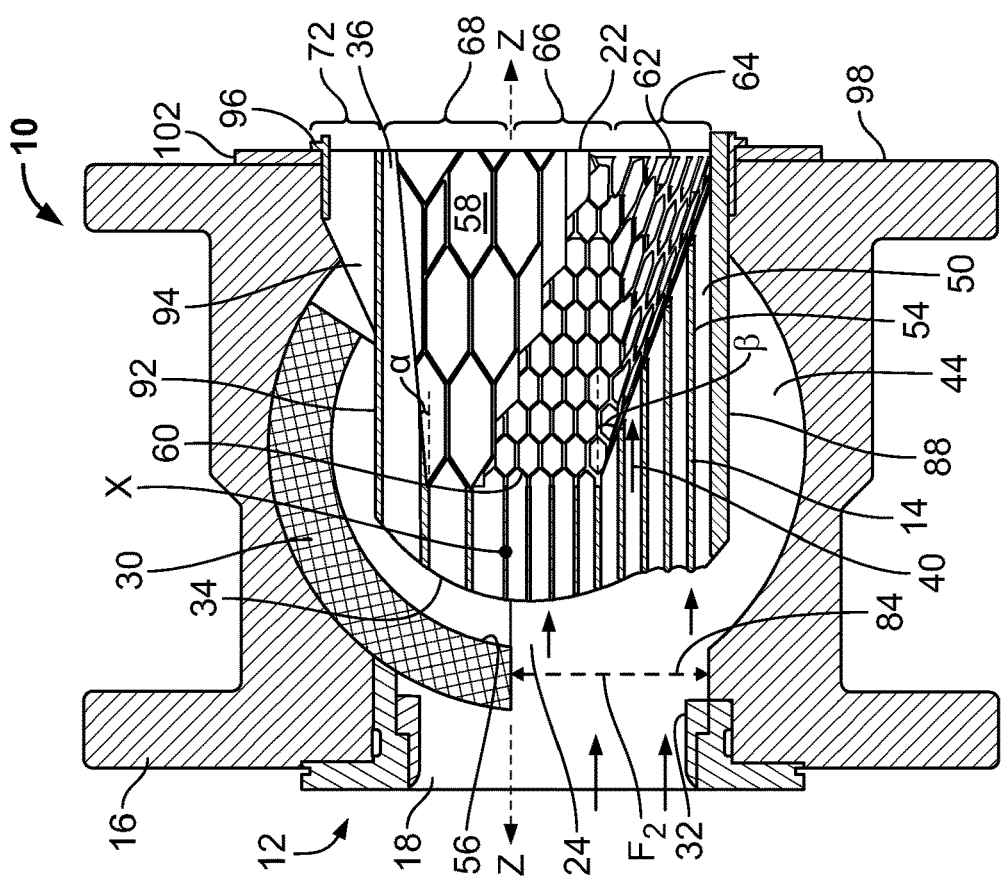
FIG. 3 is a side, cross-sectional view of the valve assembly and flow conditioner of FIG. 2 showing the control element of the valve assembly in a second open position.

Turning specifically to FIGS. 2 through 4, the valve assembly 10 is shown from another perspective to more clearly illustrate fluid flow through the valve 12 and flow conditioner 14 during operation. The dividing segments 64, 66, 68, and 72 of the plurality of flow channels 50 of the flow conditioner 14 are arranged relative to the rotation of the control element 30. For example, the control element 30 moves between a first open position, shown in FIG. 2, a second open position, shown in FIG. 3, and a third open position, shown in FIG. 4. In each particular position, the control element 30 and flow conditioner 14 causes fluid to flow through certain segments 64, 66, 68, and 72 of the flow conditioner 14 and blocks fluid from flowing through other segments 64, 66, 68, and 72. Each segment 64, 66, 68, and 72 of the flow conditioner 14 is positioned relative to the travel path of the control element 30 and to an opening 84 of the valve 12. The first, second, third, and fourth segments 64, 66, 68, and 72 are arranged and shaped to correspond with a shape of the opening 84 at the port 32 when the control element 30 occupies first, second, third, and fully open positions.

As the opening 84 of the port 32 widens, an average cross-sectional area (e.g., $A_1$, $A_2$, $A_3$, $A_4$) of each of the channels 50 gradually increases such that the smallest flow channels 50 are exposed to fluid flow at the smallest valve opening (i.e., where fluid pressure is high), and the largest flow channels 50 are exposed to fluid flow at the largest valve opening 84 (i.e., at the fully open valve position when fluid pressure is low).

In FIG. 2, the control element 30 is in the first open position. In this example, the control element 30 occupies the first open position after the valve stem 26 rotates the control element 30 thirty degrees about the X axis away from the closed position. In the first position, the control element 30 permits fluid to flow through the opening 84 at the port 32 and into a first group channels 50A of the first segment 64 of the flow conditioner 14. When the control element 30 is in the first open position, the opening 84 at the port 32 has a first cross-sectional flow area $F_1$, which approximately corresponds to the total area of the first segment 64 of channels 50. While in the first open position, the control element 30 exposes the first segment 64 of channels 50, and blocks fluid from directly flowing into the channels 50 of the second, third, and fourth segments 66, 68, and 72.

In FIG. 3, the control element 30 is in the second open position. In this example, the control element 30 occupies the second open position after the valve stem 26 rotates the control element 30 fifty degrees about the X axis away from the closed position. In the second open position, the control element 30 permits fluid to flow through the opening 84 at the port 32 and into the channels 50A of the first segment 64 and into a second group of channels 50B of the second segment 66. In the second open position, the opening 84 at the port 32 has a second cross-sectional flow area $F_2$ that is larger than the first flow area $F_1$, which approximately corresponds to the total area of the first and second segments 64 and 66 of channels 50. While in the second open position, the control element 30 exposes the first and second segments 64 and 66 of channels 50, and blocks fluid from directly flowing into the channels 50 of the third and fourth segments 68 and 72.

In FIG. 4, the control element 30 is in the third open position. In this example, the control element 30 occupies the third open position after the valve stem 26 rotates the control element 30 eighty degrees about the X axis away from the closed position. In the third open position, the control element 30 permits fluid to flow through the opening 84 at the port 32 and into the channels 50A of the first segment 64, the channels 50B of the second segment 66, and into a third group of channels 50C of the third segment 68. In the third open position, the opening 84 at the port 32 has a third cross-sectional flow area $F_3$ that is larger than the first flow area $F_1$ and the second flow area $F_2$. The third cross-sectional flow area $F_3$ approximately corresponds to the total area of the first, second, and third segments 64, 66, and 68 of channels 50. While in the third open position, the control element 30 exposes the first, second, and third segments 64, 66, and 68 of channels 50, and blocks fluid from directly flowing in the channels 50 of the fourth segment 72. When the control element 30 is in a fully open position, the port 32 of the valve body 16 permits fluid to flow into a fourth grouping 50D of channels 50 of fourth segment 72.

Figure 5:
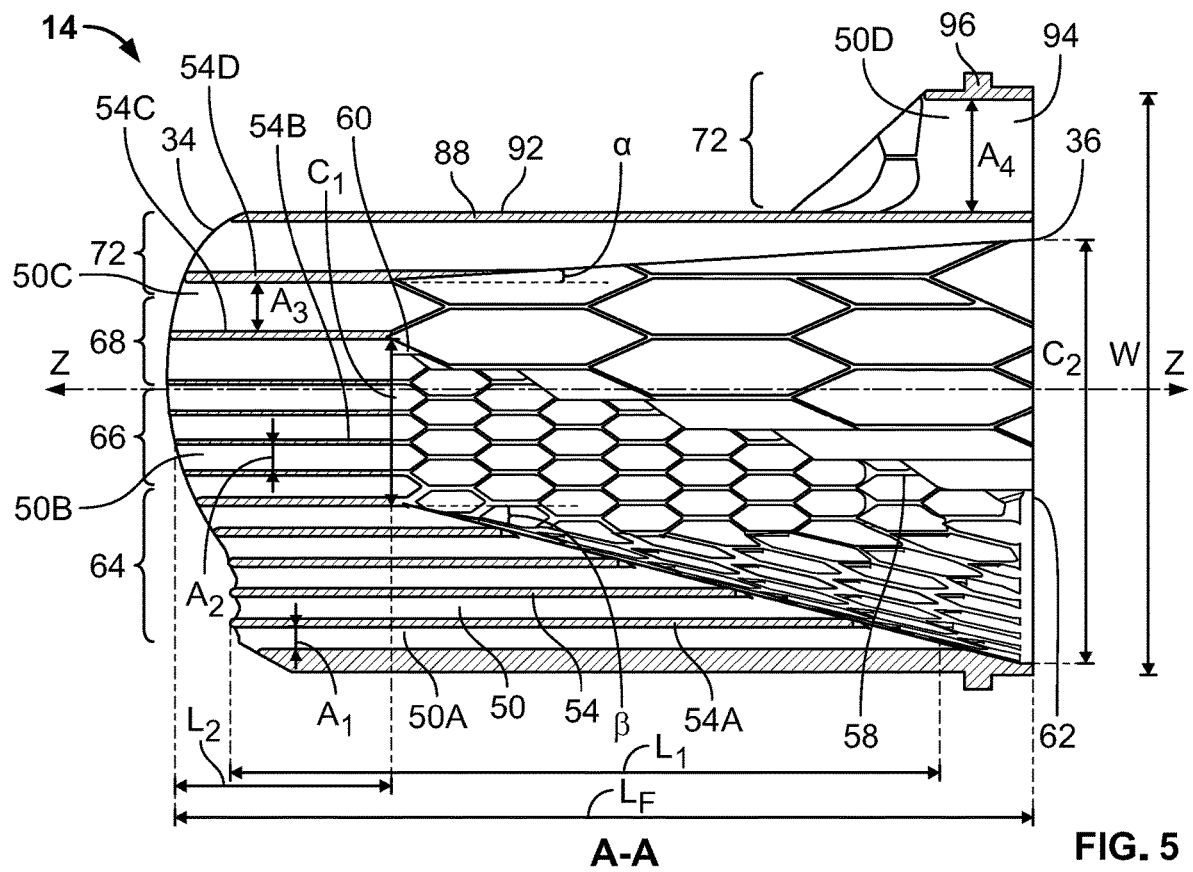
FIG. 5 is side, cross-sectional view of the flow conditioner of FIG. 1.
Figure 6:
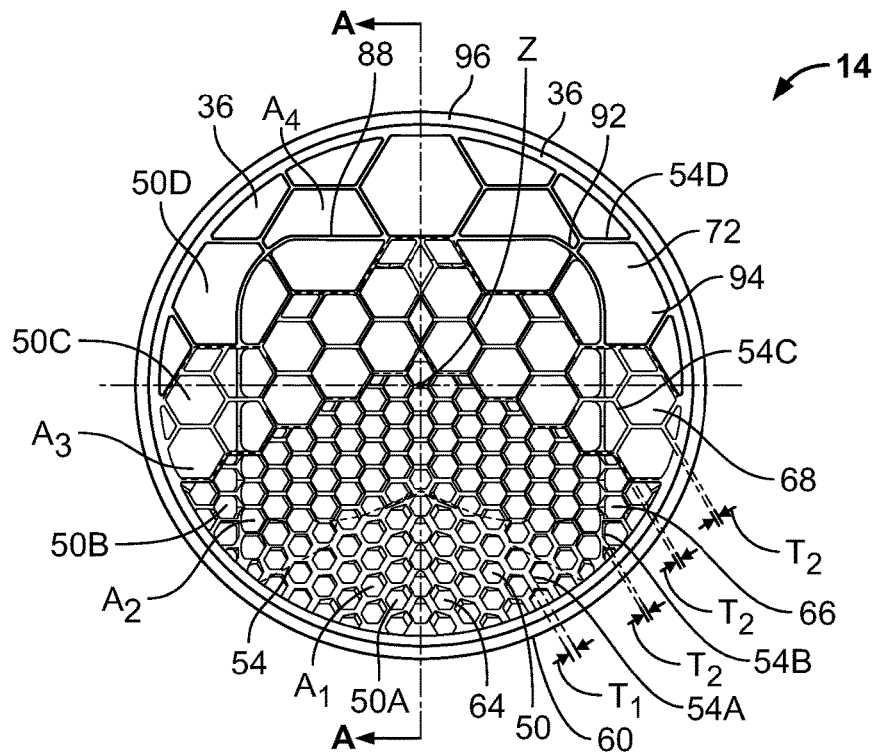
FIG. 6 is a front view of the flow conditioner of FIG. 1.

The flow conditioner 14 is symmetrical about the cross-sectional plane A-A that intersects the longitudinal axis Z and extends in a direction indicated by a width W of the flow conditioner 14 (FIGS. 5 and 6). An outer wall 88 defines a rounded, tubular shape of the flow conditioner 14 such that the flow conditioner 14 may be installed in a cylindrical chamber, pipe, or conduit. The outer wall 88 is not uniformly cylindrical, however, and includes a main body portion 92 that extends into the chamber 44 of the valve body 16 (FIGS. 1 through 4), and a rear body portion 94 that is partially stepped outward in a radial direction relative to the longitudinal axis Z from the main body portion 92. The flow conditioner 14 also includes an annular rim 96 that extends radially outward from the outer wall 88 of the rear body portion 94. The rim 96 has an outer diameter that is greater than an inner diameter of the valve body 16 such that the rim 96 extends beyond an outer surface 98 of the valve body 16, as shown in FIGS. 1 through 4, when the flow conditioner 14 is coupled to the valve 12. The flow conditioner 14 is secured (e.g., fastened, attached, welded, clamped) to the valve body 16 by a fitting 102 disposed between the rim 96 and the outer surface 98 of the valve body 16. In this particular example, the rim 96 is secured to the outer surface 98 of the valve body 16 at the outlet 22 such that the fluid flow path 24 of the valve body 16 is in fluid communication with the second flow path 40 of the flow conditioner 14. In some examples, the outer wall 88 may be coupled to a pipe, tailpiece, or other conduit coupled to the valve body 16 of the valve assembly 10. In one example, the flow conditioner 14 may be integrated with valve body 16 at the outlet 22 or integrated with a conduit, such as a pipe or tailpiece, mounted to the valve body 16.

In FIGS. 5 and 6, the channel arrangement of the flow conditioner 14 is shown in more detail. Generally, the channels 50 have a hexagonal cross-sectional shape and are separated by the plurality of walls 54. In FIG. 6, the segments are separated by dashed lines. The outer wall 88 surrounds the plurality of channels 50 and has a different thickness than the plurality of walls 54 separating the channels 50. The plurality of channels 50 of each segment 64, 66, 68, and 72 include border channels or partial channels that may have a cross-sectional area that is smaller than a cross-sectional area of the other channels in that particular segment. However, as referred herein, an exemplary channel of each section refers to a channel having an average cross-sectional area of the channels of that segment.

The first segment 64 defines the lower-most channels 50 (relative to FIGS. 5 and 6) of the flow conditioner 14. An exemplary channel 50A of the first segment 64 of channels 50 has an average cross-sectional area $A_1$. The plurality of channels 50A of the first segment 64 are separated from one another by a first wall 54A having a first wall thickness $T_1$. By comparison to the channels 50 of the second, third, and fourth segments 66, 68, and 72, the channels 50A of the first segment 64 extend almost entirely across a length $L_F$ of the flow conditioner 14 (FIG. 5). The channels 50A of the first segment 64 are longer than the other channels 50 to help reduce turbulent fluid flow in the valve 12. For example, as shown in FIG. 5, a length $L_1$ of the channel 50A of the first segment 64 is greater than a length $L_2$ of a channel 50B of the second segment 66. Additionally, the walls 54A of the first segment 64 are thicker than the walls 54 of the other segments 66, 68, and 72 to resist erosive cavitation.

An exemplary channel 50B of the second segment 66 has an average cross-sectional area $A_2$ that is larger than the average cross-sectional area $A_1$ of one of the channels 50A of the first segment 64. The plurality of channels 50B of the second segment 66 are separated from one another by a second wall 54B having a second wall thickness $T_2$ that is less than the first wall thickness $T_1$ of the first wall 54A of the first segment 64. Each channel 50C of the third segment 68 has an average cross-sectional area $A_3$ that is larger than the average cross-sectional area $A_2$ of the channels 50B of the second segment 66. The channels 50 of the fourth segment 72 have the largest average cross-sectional area $A_4$. In the illustrated example, the first and second segments 64 and 66 have more channels than the third and fourth segments 68, 72 because the first and second segments 64 and 66 are exposed to higher differential fluid pressures at smaller valve openings. Thus, to resist impact of cavitation, the flow conditioner 14 forces fluid to flow through multiple smaller flow channels 50A and 50B of the first and second segments 64 and 66 to break up turbulent flow into smaller flow paths.

In the illustrated example of FIG. 6, a ratio of the wall thickness $T_1$ and a cross-distance (i.e., the distance across the opening or cross-sectional area $A_1$) of the channels 50A of the first segment 64 is in a range of approximately 1:3 to approximately 1:2 (e.g., approximately 11:28). Accordingly, at the lower-most portion of the flow conditioner 14, the plurality of channels 50A of the first segment 64 has the smallest average cross-sectional area $A_1$ of the plurality of channels 50, and the wall thickness $T_1$ is greatest at the first segment 64. In this way, the first segment 64 resists fluid flow with a greater wall thickness and with narrower flow channels 50A in which the process fluid may flow. The average cross-sectional area $A_2$ of the channels 50B of the second segment 66 is greater than the average cross-sectional area $A_1$ of the first segment 64 and the wall thickness $T_2$ of the second section 66 is less than the wall thickness $T_1$ of the first segment 64. A ratio of the wall thickness $T_2$ and a cross-distance of the channels 50B of the second segment 66 is in a range of approximately 1:6 to approximately 1:4. The average cross-sectional area $A_3$ of the channels 50C of the third segment 68 is greater than the average cross-sectional area $A_2$ of the second segment 66 and the wall thickness $T_2$ of the third section 68 is the same as the wall thickness $T_2$ of the second segment 66. A ratio of the wall thickness $T_2$ and average a cross-distance of the channels 50C of the third segment 68 is in a range of approximately 1:12 to approximately 1:11. The average cross-sectional area $A_4$ of the channels 50D of the fourth segment 78 is greater than the average cross-sectional area $A_3$ of the third segment 68 and the wall thickness $T_2$ of the fourth segment 72 is the same as the wall thickness $T_2$ of the second and third segments 66, 68. A ratio of the wall thickness $T_2$ and average a cross-distance of one of the channels 50D of the fourth segment 72 is in a range of approximately 1:25 to approximately 1:23. Further, a ratio of the average cross-sectional area $A_4$ of one of the plurality of channels 50D of the fourth segment 72 to the average cross-sectional area $A_3$ of one of the plurality of channels 50C of the third segment 68 is approximately 2:1. A ratio of the average cross-sectional area $A_3$ of one of the plurality of channels 50C of the third segment 68 to the average cross-sectional area $A_2$ of one of the plurality of channels 50B of the second segment 66 may be in a range of approximately 2:1 to approximately 5:1 (e.g., approximately 20:9). A ratio of the average cross-sectional area $A_4$ of one of the plurality of channels 50D of the fourth segment 72 to the average cross-sectional area $A_1$ of one of the plurality of channels 50A of the first segment 64 is in a range of approximately 6:1 to approximately 4:1

(e.g., approximately 21:4). The flow conditioner 14 may include a different pattern and variation in cross-sectional area and shape to add more complexity and/or to more closely match a geometry of the particular valve 12 or control element 30. Additionally, in another example, the wall thickness $T_2$ of the second, third, and fourth segments 66, 68, and 72 may be different.

In FIG. 6, the plurality of channels 50 of the flow conditioner 14 generally have a uniform cross-sectional shape, which in this case, is hexagonal. However, and as discussed above, the wall thicknesses $T_1$ and $T_2$ of the plurality of walls 54 and the average cross-sectional area $A_1$, $A_2$, $A_3$, $A_4$ of the plurality of channels 50 varies along the width W of the flow conditioner 14. In other examples, the cross-sectional area of the each channel 50 may gradually decrease and/or the wall thickness separating the channels 50 may increase from the first segment 64 towards the fourth segment 72. For example, the channel 50A of the first segment 64 may have cross-sectional area $A_1$ that is larger than the cross-sectional area $A_2$ of the channel 50B of the second segment 66. Additionally, in other examples, a cross-sectional area of each of the flow channels 50 may be the same for two or more of the four segments 64, 66, 68, 72, or the plurality of channels 50 may be further divided to provide a wider range of cross-sectional areas.

Figure 7:
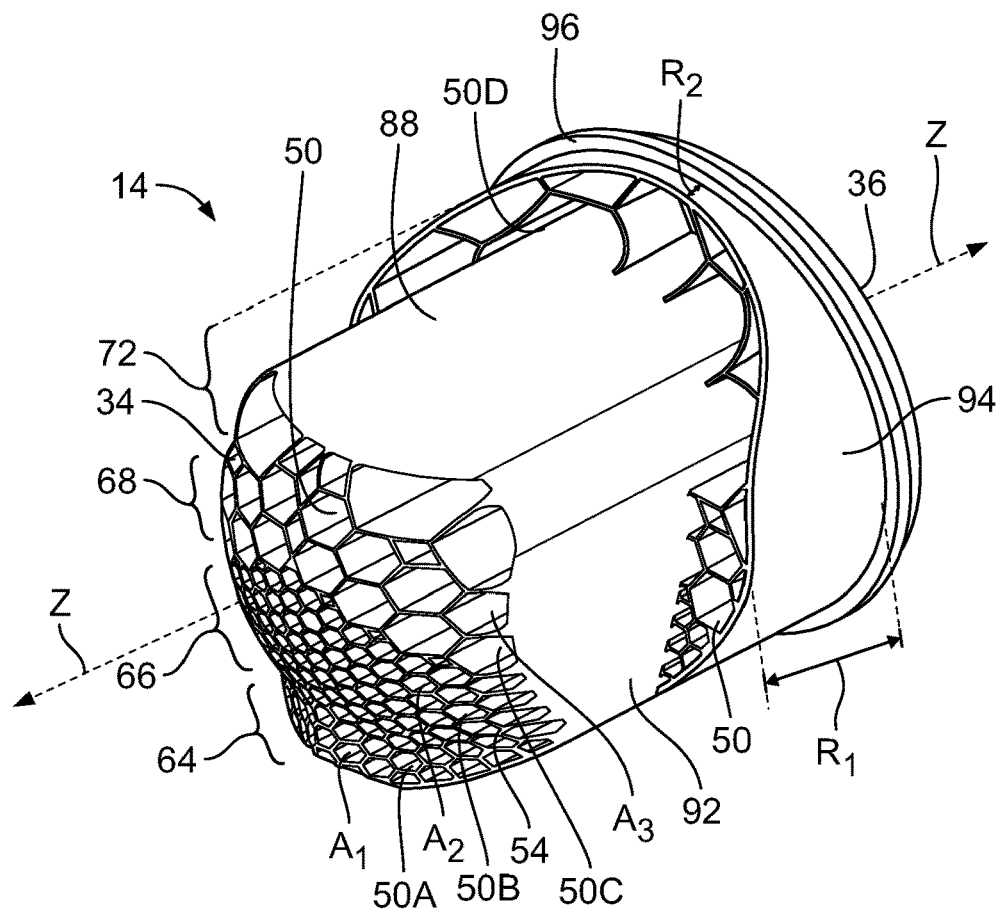
FIG. 7 is a front, perspective view of the flow conditioner of FIG. 1.
Figure 8:
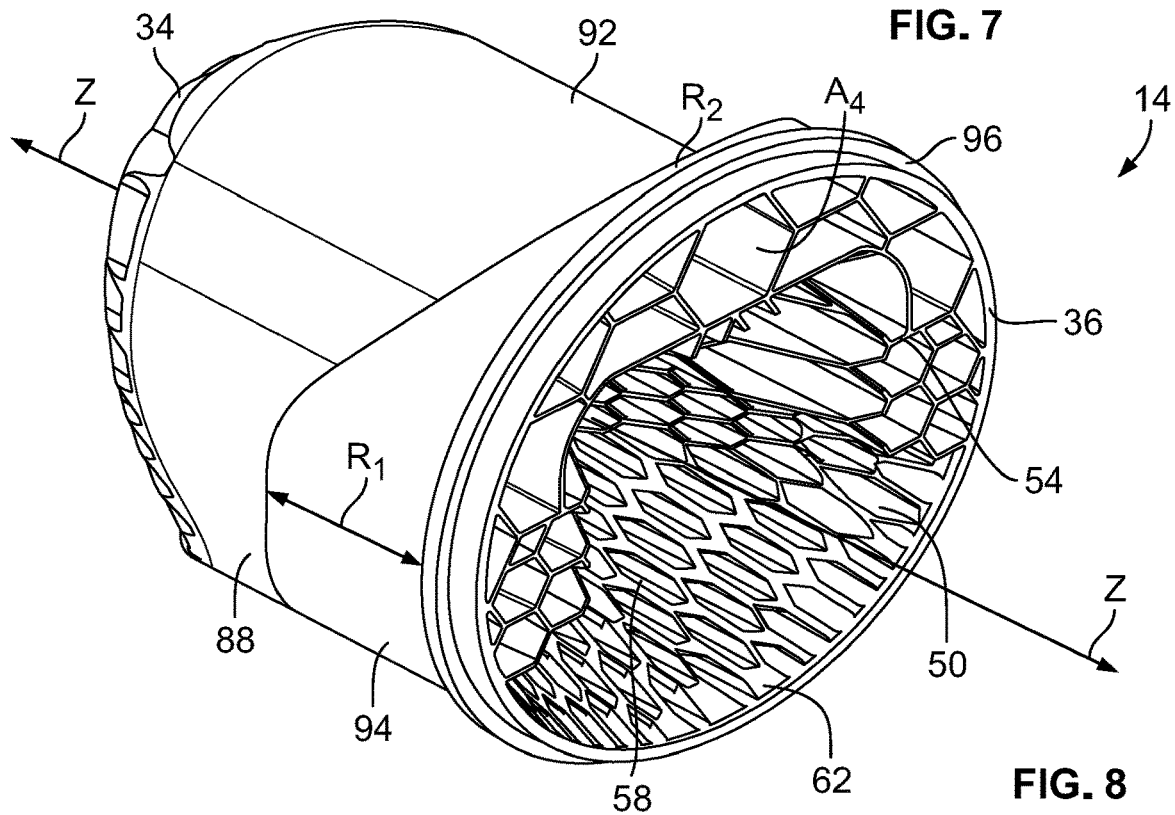
FIG. 8 is a back perspective view of the flow conditioner of FIG. 1.

Turning to FIGS. 5 through 8, the flow conditioner 14 is shaped to receive fluid flow and condition fluid before the fluid reaches the outlet 22 of the valve 12. As shown in the front view in FIG. 6, the outer wall 88 of the main body portion 92 forms a rounded, upside-down U-shape structure, which divides a portion of the plurality of the channels 50 of the second, third, and fourth segments 66, 68, and 72. To the right and left sides of the main body portion 92 (from the perspective of FIG. 6), the rear body portion 94 extends outwardly from the upside-down U-shape main body portion 92 to define a circular circumference of the flow conditioner 14. The rear body portion 94 is non-uniform and has a contoured profile from both the side perspective in FIG. 5 and the front perspective in FIG. 6. As shown in FIGS. 7 and 8, at the second and third segments 66 and 68 of channels 50, the rear body portion 94 extends radially outward relative to the longitudinal Z axis, and forms a sharp edge relative to the main body portion 92. At the fourth segment 72 of channels 50, the rear body portion 94 slopes away from the main body portion 92 at an angle less than ninety degrees. For example, a first length $R_1$ (parallel to the longitudinal Z axis) of the rear body portion 94 is greater at the second and third segments 66 and 68 of channels 50, and a length $R_2$ of the rear body portion 94 is smallest at the fourth segment 72 of channels 50. This stepped and sloped structure of the rear body portion 94 exposes the flow channels 50 of the rear portion 94. As such, fluid flowing around the main body portion 92 flows through the channels 50 of the rear body portion 94 before exiting the flow conditioner 14. As shown in FIG. 8, the flow channels 50 of the stepped rear body portion 94 border the cavity 58. At the first segment 64 of channels 50, the main body portion 92 and the rear body portion 94 of the first segment 64 of the plurality of channels 50 are unified such that the outer wall 88 of the rear body portion 94 is coextensive with the outer wall 88 of the main body portion 92 along the length $L_F$ of the flow conditioner 14.

Figure 9:
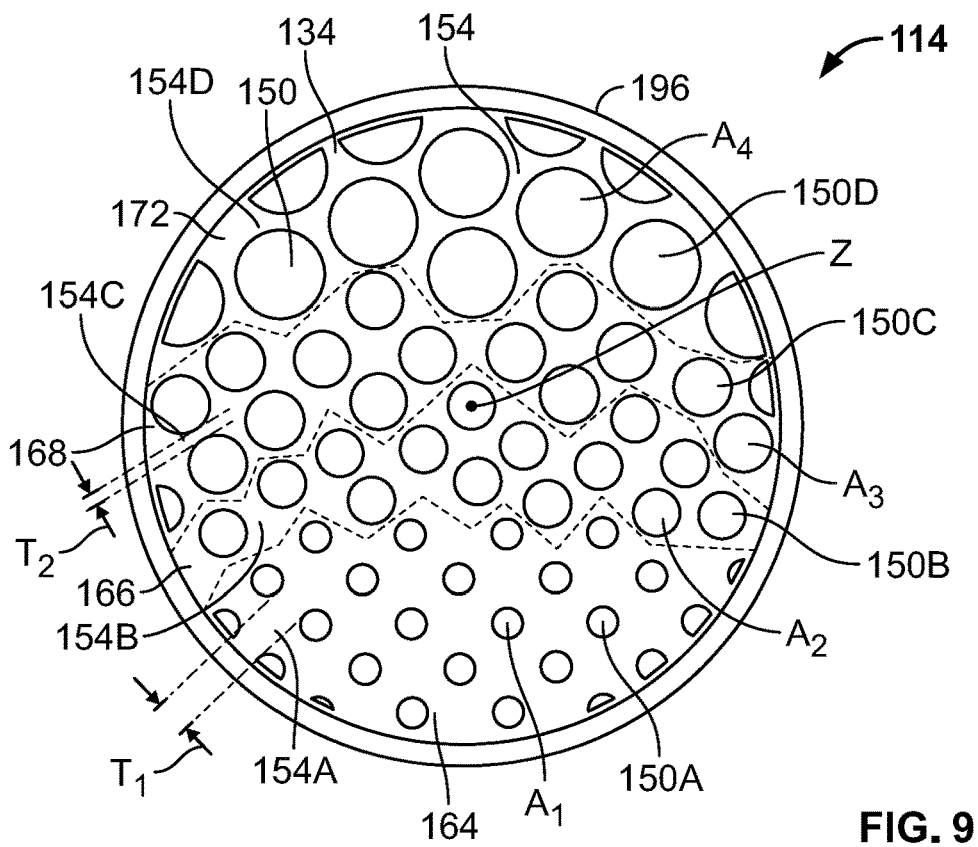
FIG. 9 is a front view of a second exemplary flow conditioner assembled in accordance with the teachings of the present disclosure.
Figure 10:
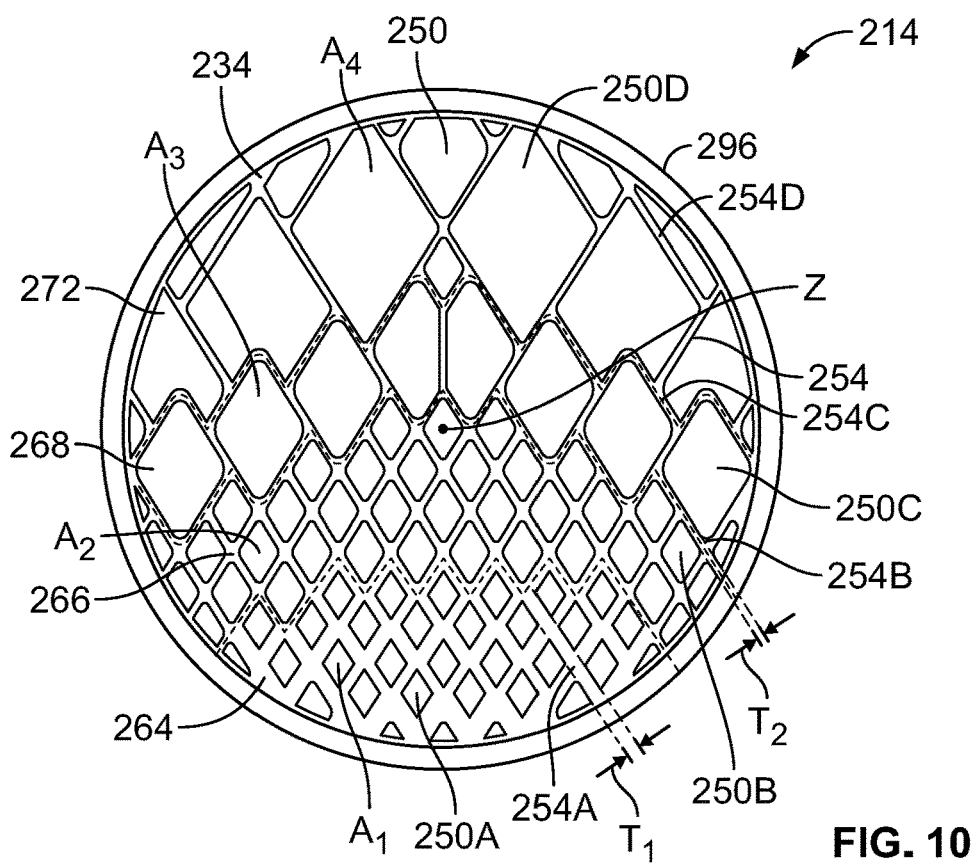
FIG. 10 is a front view of a third exemplary flow conditioner assembled in accordance with the teachings of the present disclosure.

In FIG. 9, a second exemplary flow conditioner 114 is constructed according to the teachings of the present disclosure, and in FIG. 10, a third exemplary flow conditioner 214 is constructed according to the teachings of the present disclosure. The second and third exemplary flow conditioners 114 and 214 are similar to the first exemplary flow conditioner 14 described above, except that a plurality of channels 150 of the second exemplary flow conditioner 114 and a plurality of channels 250 of the third exemplary flow conditioner 214 are arranged differently. Thus, for ease of reference, and to the extent possible, the same or similar components of each flow conditioner 114 and 214 will retain the same reference numbers as outlined above with respect to the first flow conditioner 14, although the reference numbers will increase by 100 and 200, respectively.

The flow conditioner 114 of FIG. 9 includes a first segment 164, a second segment 166, a third segment 168, and a fourth segment 172 of the plurality of channels 150. By comparison to the flow channels 50 of the first exemplary flow conditioner 14, the flow channels 150 of the second exemplary flow conditioner generally have a circular cross-sectional shape. A first flow channel 150A of the first segment 164 includes an average cross-sectional area $A_1$, and a second flow channel 150B of the second segment 166 includes an average cross-sectional area $A_2$ that is greater than the $A_1$. A third flow channel 150C of the third segment 168 includes an average cross-sectional area $A_3$, and a fourth flow channel 150D of the fourth segment 172 includes an average cross-sectional area $A_4$ that is greater than the average cross-sectional areas $A_1$, $A_2$, and $A_3$ of each of the first, second, and third flow channels 150A, 150B, and 150C. A wall thickness of a plurality of walls 154 separating the plurality of channels 150 gradually decreases in a direction (upwards in FIG. 9) from the first segment 164 to the fourth segment 172. In FIG. 10, a plurality of channels 250 of the third exemplary flow conditioner 214 has a uniform cross-sectional diamond shape. Similar to the first and second flow conditioners 14 and 114, the average cross-sectional area of each of the channels 250 increases and a thickness of a plurality of walls 254 gradually decreases in a direction (upwards in FIG. 10) from a first segment 264 to a fourth segment 272 of channels 250.

Any one of the first, second, or third flow conditioners 14, 114, or 214 of the present disclosure is configured to condition process fluid through a valve 12 to reduce turbulence of fluid flow and propagation of noise. The exemplary flow conditioners 14, 114, and 214 may reduce noise levels and delay onsite cavitation when coupled to rotary valves, such as notched ball valves. The cross-sectional area of each of the plurality of channels 50, 150, and 250 of the flow conditioners 14, 114, and 214 generally increases as the valve 12 opens to allow increased flow through the valve 12. At the smaller openings of the valve 10 (e.g., FIG. 2), where cavitation may be more severe, the wall thickness $T_1$ between the channels 50, 150, 250 is greater and the cross-sectional flow area of the channels 50 is smaller. The wall thickness and narrow flow channels at the first segments 64, 164, and 264 help protect the flow conditioners 14, 114, and 214 against cavitation. In particular, the thick walls 54, 154, and 254 mitigate erosion caused by cavitation, and therefore improves the longevity of the flow conditioners 14, 114, and 214 against wear. Because pressure drop decreases when the valve 12 opens wider, cavitation also decreases. Thus, at larger valve openings, where cavitation is less severe, the wall thickness between the channels 50, 150, and 250 decreases to increase fluid flow through the flow conditioner 14, 114, and 214 and to reduce material costs related to manufacturing. The cavity 58 formed in the flow conditioner 14 also reduces flow resistance and subsequently, increases flow rate through the flow conditioner 14. Additionally, the manufacturing time and costs are reduced as less material is required.

It will be appreciated that the plurality of channels 50, 150, and 250 may be formed by additive manufacturing or other manufacturing methods to provide any number of different configurations with varying complexity to achieve desirable flow conditions or noise attenuating effects. The flow conditioners 14, 114, and 214 may be formed in whole or in part of a lattice structure, which is a three-dimensional arrangement or array of connected structural elements (i.e. lattice members or lattice cell units forming the plurality of channels 50, 150, and 250) that may be arranged diagonally, horizontally, and vertically to form a plurality of round, diamond, rectangular or other polygonal shape openings in a pattern. The openings may together or separately form the plurality of channels 50, 150, and 250 of the lattice portions of the flow conditioners 14, 114, and 214. The plurality of lattice members may be separate elements, or the lattice members may be joined together (or formed together) to make an integral structure having a lattice pattern.

Creating a customized flow conditioner 14, 114, and 214 using an AM technique or process that builds three-dimensional objects by adding successive layers of material on a material or receiving surface. The AM technique may be performed by any suitable machine or combination of machines. The AM technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The AM technique may include any of several techniques or processes, such as, for example, a stereolithography ("SLA") process, digital light processing ("DLP"), a fused deposition modeling ("FDM") process, a multi-jet modeling ("MJM") process, a selective laser sintering ("SLS") process, a selective laser melting ("SLM") process, an electronic beam melting ("EBM") process, and an arc welding AM process. In some embodiments, the AM process may include a directed energy laser deposition process. Such a directed energy laser deposition process may be performed by a multi-axis computer-numerically-controlled ("CNC") lathe with directed energy laser deposition capabilities. Other manufacturing techniques may be utilized to create a flow conditioner according to the present disclosure, and are not limited to the techniques herein. Additionally, the flow conditioner 14, 114, and 214 may be fabricated using other manufacturing processes and techniques outside of the AM technical field, such as, for example, investment casting and welding.

In addition to the examples illustrated herein, the pattern of flow channels may be specifically designed for particular processes or applications. For example, the four segments 64, 66, 68, 72, 164, 166, 168, 172, 264, 266, 268, and 272 may vary in shape, size, and gradual increase or decrease of opening size and wall thickness depending on fluid flow and pressure drop in the system. The skilled person would understand that AM may utilize any number three-dimensional printers or AM machines that are available and that are suitable for making and designing a flow conditioner in accordance with the present disclosure. AM enables a design-driven manufacturing process such that the flow conditioner of a valve assembly may be manufactured based on the design requirements, and not based on the restriction and limited capabilities of manufacturing methods. AM affords design flexibility, integration of new materials and structures, and customization of body components. Additive manufacturing may be used for designing light, stable, customizable and complex structures, thereby saving a manufacturer costs related to labor and materials associated with finishing processes. Additive manufacturing allows each flow conditioner 14, 114, and 214 to be customized according to the requirements of the process for which it is used.

For example, a custom-manufactured flow conditioner 14, 114, and 214 made by AM techniques or other methods, may achieve desirable flow characteristics, strength properties, or other traits to effectively reduce noise and turbulence within, or downstream from, a control valve. The plurality of channels 50, 150, and 250 arranged in the flow conditioners 14, 114, and 214 described herein may condition fluid flow through a control valve or conduit to extend the life of the control valve or conduit. By separating the flow path of the control valve into multiple channels, multiple smaller jet streams are created, which may help reduce flow turbulence. In another example, the pattern of the plurality of channels 50, 150, and 250 may be configured in particular arrangements to create flow restrictions.

A flow conditioner 14, 114, and 214 constructed according to the teachings of the present disclosure may also serve as a universal flow conditioner capable of being retrofit to a number of different rotary control valves. For example, the first end of the first, second, and third exemplary flow conditioners 14, 114, and 214 is contoured so that each flow conditioner 14, 114, and 214 may be used with a number of different rotary control valves, while still achieving closer placement of the flow conditioner 14, 114, and 214 relative to the control element 30 of the valve 12. Further, each of the flow conditioners 14, 114, and 214 may be placed upstream or downstream from a control valve, within a conduit, integrated with a conduit, or clamped between two conduits in a pipeline.

The figures and description provided herein depict and describe preferred examples of a valve assembly having a flow conditioner and a flow conditioner for purposes of illustration only. One skilled in the art will readily recognize from the foregoing discussion that alternative variants of the components illustrated herein may be employed without departing from the principles described herein. Thus, upon reading this disclosure, those of skill in the art will appreciate still additional alternative structural and functional designs for flow conditioners. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A valve assembly comprising:
    a valve body defining an inlet, an outlet, and a fluid flow path connecting the inlet and the outlet;
    a valve port disposed in the fluid flow path;
    a valve stem disposed in the valve body;
    a control element disposed in the fluid flow path, the control element operatively connected to the valve stem such that the control element is rotatable by the valve stem about a pivot axis between an open position, in which the control element permits fluid flow through the valve port, and a closed position, in which the control element seals the valve port;

a flow conditioner coupled to the valve body and including a first end adjacent to the control element, a second end adjacent to the outlet, and a plurality of channels extending between the first end and the second end, the plurality of channels in fluid communication with the fluid flow path of the valve body when the control element is in the open position; and the flow conditioner further including a plurality of walls separating the plurality of channels, a first wall separating at least two channels having a first thickness and a second wall separating at least two channels having a second thickness different than the first thickness;

wherein a portion of the first end of the flow conditioner is convex;

wherein the pivot axis of the valve stem intersects a portion of the flow conditioner.

2. The valve assembly of claim 1, wherein a first portion of the plurality of channels is arranged into a first segment and a second portion of the plurality of channels is arranged into a second segment adjacent the first segment, and wherein the first wall separates at least two channels of the first segment, and the second wall separates at least two channels of the second segment.

3. The valve assembly of claim 2, wherein the first thickness is greater than the second thickness.

4. The valve assembly of claim 2, wherein an average cross-sectional area of one of the plurality of channels at the first segment is different than an average cross-sectional area of one of the plurality of channels at the second segment.

5. The valve assembly of claim 4, wherein the average cross-sectional area of the one of the plurality of channels of the first segment is less than the average cross-sectional area of the one of the plurality of channels of the second segment.

6. The valve assembly of claim 5, wherein an average length of the one of the plurality of channels of the first segment is greater than an average length of the one of the plurality of channels of the second segment.

7. The valve assembly of claim 2, wherein when the control element occupies a first open position, the first segment is exposed to direct fluid flow and the second segment is blocked from direct fluid flow.

8. The valve assembly of claim 7, wherein the plurality of channels are further arranged into a third segment adjacent to the second segment, and a fourth segment adjacent to the third segment, wherein the control element occupies a third open position, the plurality of channels of the third segment is exposed to direct fluid flow and the plurality of channels of the fourth segment is blocked from direct fluid flow.

9. The valve assembly of claim 8, wherein a ratio of average cross-sectional area of one of the plurality of channels of the fourth segment to average cross-sectional area of one of the plurality of channels of the third segment is approximately 2:1.

10. The valve assembly of claim 8, wherein a ratio of average cross-sectional area of one of the plurality of channels of the fourth segment to average cross-sectional area of the one of the plurality of channels of the first segment is in a range of approximately 6:1 to approximately 4:1.

11. The valve assembly of claim 1, wherein the flow conditioner includes a cavity disposed between the first end and the second end of the flow conditioner, the cavity in fluid communication with a portion of the plurality of channels.

12. The valve assembly of claim 11, wherein the cavity has a first end and a second end adjacent to the second end of the flow conditioner, the first end of the cavity having a cross-sectional area that is smaller than a cross-sectional area of the second end of the cavity.

13. The valve assembly of claim 1, further comprising a chamber defined by the valve body and sized to receive the control element, and wherein the first end of the flow conditioner is disposed in the chamber adjacent the control element.

14. A flow conditioner of a valve assembly, the flow conditioner comprising:

a body having a first end and a second end;

a plurality of channels extending between the first end and the second end of the body, the plurality of channels arranged in at least a first segment and a second segment adjacent to the first segment;

a plurality of walls, each wall of the plurality of walls separating at least two channels of the plurality of channels;

wherein an average cross-sectional area of one of the plurality of channels of the second segment is greater than an average cross-sectional area of one of the plurality of channels of the first segment; and wherein a portion of the first end of the body is convex.

15. The flow conditioner of claim 14, wherein a wall thickness of the first segment is greater than a wall thickness of the second segment.

16. The flow conditioner of claim 15, wherein a ratio of wall thickness to an average cross-distance of the one of the plurality of channels of the first segment is in a range of approximately 1:3 to approximately 1:2.

17. The flow conditioner of claim 14, wherein the plurality of channels are further arranged into a third segment, and an average cross-sectional area of one of the plurality of channels of the third segment is greater than an average cross-sectional area of one of the plurality of channels of the second segment.

18. The flow conditioner of claim 17, wherein a ratio of the average cross-sectional area of one of the plurality of channels of the third segment to the average cross-sectional area of one of the plurality of channels of the second segment is in a range of approximately 2:1 to approximately 5:1.

19. The flow conditioner of claim 17, wherein a ratio of the average cross-sectional area of one of the plurality of channels of the third segment to the average cross-sectional area of the one of the plurality of channels of the first segment is in a range of approximately 2:1 to approximately 6:1.

20. A flow conditioner of a valve assembly, the flow conditioner comprising:

a body having a first end, a second end, and a longitudinal axis;

a plurality of channels extending between the first end and the second end of the body, the plurality of channels parallel with the longitudinal axis and arranged in at least a first segment and a second segment, the second segment adjacent to the first segment;

a first wall thickness defining the plurality of channels of the first segment and a second wall thickness defining the plurality of channels of the second segment, the first wall thickness greater than the second wall thickness; and a cavity formed in the body and in fluid communication with a portion of the plurality of channels;

wherein an average cross-sectional area of one of the plurality of channels of the second segment is greater than an average cross-sectional area of one of the plurality of channels of the first segment; and wherein a portion of the first end of the body is convex.

* * * * *

UNITED STATES PATENT AND TRADEMARK OFFICE
CERTIFICATE OF CORRECTION

PATENT NO. : 11,162,613 B2
APPLICATION NO. : 16/171661
DATED : November 2, 2021
INVENTOR(S) : Jason D. Jablonski et al.

Page 1 of 1

It is certified that error appears in the above-identified patent and that said Letters Patent is hereby corrected as shown below:

In the Specification

At Column 3, Line 47, "is" should be -- is a --.

At Column 4, Line 34, "flow conditioner 16" should be -- flow conditioner 14 --.

At Column 4, Line 36, "includes of" should be -- includes --.

At Column 5, Lines 35-36, "valve assembly 12" should be -- valve assembly 10 --.

At Column 11, Line 55, "decrease of" should be -- decrease in --.

Signed and Sealed this
Second Day of August, 2022

Katherine Kelly Vidal
*Director of the United States Patent and Trademark Office*